United States Patent
Bayer et al.

US005468786A

[11] Patent Number: 5,468,786
[45] Date of Patent: Nov. 21, 1995

[54] RADIATION-CURABLE REACTION RESIN SYSTEM

[75] Inventors: Heiner Bayer, Olching; Barbara Lehner; Michael Rogalli, both of Munich, all of Germany

[73] Assignee: Siemens Aktiengesellschaft, Munich, Germany

[21] Appl. No.: 191,141

[22] Filed: Feb. 2, 1994

Related U.S. Application Data

[63] Continuation of Ser. No. 729,653, Jul. 15, 1991, abandoned.

[30] Foreign Application Priority Data

Aug. 1, 1990 [DE] Germany .......................... 42 24 449.0

[51] Int. Cl.⁶ .................................................. C08F 2/46
[52] U.S. Cl. .......................... 522/170; 522/146; 525/534
[58] Field of Search ...................... 522/170, 146; 525/534

[56] References Cited

U.S. PATENT DOCUMENTS

| | | | |
|---|---|---|---|
| 3,530,087 | 9/1970 | Hayes | 525/534 |
| 3,600,288 | 8/1971 | Viventi | 522/146 |
| 3,714,006 | 1/1973 | Anderson | 522/146 |
| 3,787,302 | 1/1974 | Ijichi | 522/146 |
| 4,028,204 | 6/1977 | Rosen | 522/146 |
| 4,113,592 | 9/1978 | Rybny et al. | 204/159.16 |
| 4,207,156 | 6/1980 | Collins et al. | 204/159.24 |
| 4,258,123 | 3/1981 | Nagashima et al. | 430/281 |
| 4,292,152 | 9/1981 | Lechtken et al. | 204/159.15 |
| 4,385,109 | 5/1983 | Lechtken et al. | 430/306 |
| 4,400,519 | 8/1983 | Hagiwara et al. | 548/461 |
| 4,480,094 | 10/1984 | Hagiwara et al. | 544/222 |
| 4,623,558 | 11/1986 | Lin | 522/146 |
| 4,661,559 | 4/1987 | Gardner | 525/534 |
| 4,690,957 | 9/1987 | Fujioka | 522/146 |
| 4,822,832 | 4/1989 | Chu | 525/438 |
| 4,972,031 | 11/1990 | Choate | 525/534 |
| 5,006,611 | 4/1991 | Schmid | 525/534 |
| 5,026,789 | 6/1991 | Weber | 525/481 |
| 5,061,605 | 10/1991 | Kawamura et al. | 430/281 |

FOREIGN PATENT DOCUMENTS

| | | |
|---|---|---|
| 0106628 | 4/1984 | European Pat. Off. . |
| 238863 | 9/1987 | European Pat. Off. . |
| 59-103793 | 6/1984 | Japan . |

*Primary Examiner*—Mark A. Chapman
*Attorney, Agent, or Firm*—Hill, Steadman & Simpson

[57] ABSTRACT

A radiation-curable reaction resin system, comprising a homogeneous solution of a thermoplastic and a reaction resin, whereby the proportion of the thermoplastic in the solution is approximately 3 to about 50% by weight. The reaction resin system has a stable shelf life. Further, the reaction resin system can be cured by radiation to form a shaped material, comprising a continuous and a discontinuous phase and which exhibits thermoplastic-like behavior.

6 Claims, No Drawings

RADIATION-CURABLE REACTION RESIN SYSTEM

This is a continuation of application Ser. No. 07/729,653, filed Jul. 15, 1991, now abandoned.

BACKGROUND OF THE INVENTION

The present invention relates to reaction resins. More specifically, the present invention relates to radiation-curable reaction resins.

Reaction resins are liquid plastics that are distinguishable from other organic products by a number of unique properties. Most significantly, reaction resins can be cured into shaped materials under variable conditions. The properties of the shaped materials include a high thermo-forming stability, a high glass transition temperature, high mechanical strength as well as good adhesion to a variety of other materials. Since reaction resins are usually multi-component systems, the properties of the shaped materials can be further varied simply by altering the stoichiometry of the individual components.

Widely used in many technical fields, reaction resins are commonly used in electrical and electronic apparatuses or component parts thereof. Component parts having high operating temperatures and/or fine structures are preferably enveloped or covered with reaction resins.

Although the curing of reaction resins into shaped materials creates new and useful properties for the shaped materials, there are certain disadvantages to this process. Specifically, these reaction resins exhibit low tenacity and ductility, a low elongation at tear, and break when slight sagging occurs. Attempts to overcome these disadvantages have included using filled reaction resin systems, whereby those properties lacking in the resin can be introduced into the shaped material via suitable fillers. Composite materials have also been used as a means of combining the properties of materials together. Examples of composite materials include fiber-filled reaction resins and fiber weaves saturated with resins.

Although various properties can be produced with filled reaction resins or composite materials, processing is, nonetheless, far more difficult. In particular, the shaped materials often exhibit anisotropic properties, particularly when fibers are utilized. Filled resins and composite materials are, therefore, unsuitable for many applications. Accordingly, an alternative approach for modifying reaction resins and their properties would enhance the utility of reaction resins.

SUMMARY OF THE INVENTION

The present invention provides a resin system and method for modifying reaction resins. In particular, the present invention provides a system and method for producing a radiation-curable reaction resin system. To this end, the present invention provides a reaction resin system comprising a reaction resin and a thermoplastic that are mixed together to form a homogeneous solution. The homogeneous solution has an unlimited shelf life in the dark. The proportion of the thermoplastic in the homogeneous solution ranges between approximately 3 to about 50% by weight.

The homogeneous solution can be cured by radiation, to form a shaped material comprising a continuous and a discontinuous phase. The shaped material assumes a new thermoplastic behavior in addition to retaining the positive properties of the reaction resin. Further, the finished reaction resin system behaves similar to a single component and exhibits improved properties with respect to tenacity and elongation at tear.

In an embodiment of the present invention, the discontinuous phase of the shaped material comprises particles having a diameter of approximately 0.05 to about 50 μm.

In a further embodiment, the resin system of the present invention includes a photoinitiator.

In an embodiment, curing by radiation is initiated by ultraviolet radiation.

In another embodiment, the reaction resin system is cationically curable.

In a further embodiment, the reaction resin system is radically curable.

Additional features and advantages of the present invention are described in, and will be apparent from, the detailed description of the presently preferred embodiments.

DETAILED DESCRIPTION OF THE PRESENTLY PREFERRED EMBODIMENTS

The present invention provides a reaction resin that retains its own unique properties while assuming a new thermoplastic behavior. In particular, reaction resins are improved with respect to their tenacity and elongation at tear.

To this end, in an embodiment, the present invention provides a radiation-curable reaction resin system, wherein a reaction resin and a thermoplastic are mixed together to form a homogeneous solution. The proportion of thermoplastic in the solution is approximately between 3 to about 50% by weight. The reaction resin system comprising a homogeneous solution is curable by radiation, thereby forming a shaped material further comprising a continuous and a discontinuous phase. The finished reaction resin system behaves similar to a single component system, having a nearly unlimited shelf life in the dark, and can be immediately used as needed without further measures.

The reaction resin system of the present invention is suitable for many of the known applications of reaction resins. Depending on the selection of the educts or individual constituents of the homogeneous solution, a wide range of low through high viscosity reaction resin systems can be obtained, with the flow behavior being adapted to the desired application.

By radiation curing, what is referred to is a curing mechanism that is merely initiated by radiation. The resultant chemical reactions that ensue following the radiation induced reaction can continue to proceed in the dark and lead to the complete and rapid curing of the system to form a shaped product.

Depending on the proportion of thermoplastic contained in the homogeneous solution, the resulting shaped material exhibits more or less thermoplastic-like behavior, whereby the essential properties of the reaction resin shaped material are also retained. Pursuant to the present invention, a property profile is obtained with the shaped material that was, heretofore, inaccessible for reaction resins individually or, in the alternative, only accessible with the use of a composite material. The reaction resin system of the present invention can, therefore, be used for applications that have not been previously utilized.

The properties of the shaped material that are formed pursuant to the present invention do not simply represent an average of the individual properties of the pure thermoplastic and the pure reaction resin. To the contrary, the shaped material exhibits a dual behavior, whereby the properties of the pure constituents are quasi-juxtaposed. This dual behavior is demonstrated through two damping peaks that are observed in the dynamic mechanical thermoanalysis (DMTA), indicating that two different phases were present in the shaped material. In addition, the diphase character was also observed with the naked eye as a cloudiness of the shaped material when the particles of the dispersed or discontinuous phase reached a particle size of approximately 0.1 μm.

Depending on the composition of the reaction resin system, the two phases can either can be pure phases or mixed phases. In either case, the continuous phase is composed predominantly of the reaction resin, whereas the thermoplastic is evident in the dispersed phase. Further, the diphase character makes it possible to preserve the properties of the "pure" constituents and allow juxtaposing of the constituents in the shaped material.

The diphase character is also an external indication of the partial incompatibility of the constituents in the shaped material. A positive effect, however, is created when the particle diameter of the dispersed phase is at least 50 nm. Particle diameter should not exceed 50 μm so that a more homogeneous shaped material is present, and the effect of the dispersed phase is not diminished.

Studies further revealed that the particle size of the dispersed phase also varies depending on the selection of the curing conditions. It has been found that with slower curing (i.e., lower temperatures or a lower power of the radiation source), a larger particle diameter is obtained in the discontinuous phase. On the other hand, with elevated temperatures and/or higher radiation power, a more homogeneous solution is obtained, wherein fewer regions having "a pure phase" can form in the shaped material.

By controlling the dispersivity or the intentional elevation or lowering of the phase boundary surface in the shaped material, the desired properties of the reaction resin system are achieved and optimized. Further, this control is only possible in radiation-curable systems, since it is only therein that the curing can be implemented at arbitrary temperatures and at different rates.

The network density of the cured reaction resin system in the continuous phase fundamentally corresponds to that of a pure reaction resin compound. Larger meshes that guarantee a firm union of the shaped material form in the network around the dispersed thermoplastic particles.

A further improvement in the mechanical properties of a reaction resin is achieved when a thermoplastic is also chemically bonded into the network when the reaction system is cured. At least at the phase boundaries, functional groups of the thermoplastic that participate in the curing of the reaction resin lead to a chemical bonding of the dispersed particles in the continuous reaction resin phase. For example, hydroxyl groups can participate in a cationically-initiated curing process.

With respect to the selection of reaction resins suitable for the present invention, nearly the entire range of radiation-curable resins can be utilized. Since the reaction resin serves as the solvent for the solid thermoplastic, only the viscosity of the reaction resin is a limiting factor as to its use. Specifically, the reaction resin must be appropriately low viscous in order to dissolve the thermoplastic.

The maximum viscosity of the resin reaction system is limited by the desired method of processing. Since elevated temperatures are not absolutely required either in the manufacture or curing of the reaction resins system, low-molecular weight, volatile constituents can also be contained therein. Similarly, the reaction resin is not limited to a uniform compound, but can also comprise a mixture of a number of compatible resins having the same or different curing mechanisms.

Suitable reaction resins include epoxy resins of the glycidyl ether type. The following can serve as the basis for the glycidyl ethers: bisphenols (i.e., bisphenol-A); di- or polyhydroxy aromatics (i.e., resorcin); polyarylalkyls having phenolic OH groups; novolaks; polyalkyleneglycols or multiple alcohols as well (i.e., glycerine or pentaerythritol). Further, additional suitable compounds of the glycidyl ether-ester type include: parahydroxybenzoic acid-glycidyl ether ester; pure glycidyl ester of multiple carbonic acids having an aliphatic or aromatic nucleus (i.e., hexahydrophthalic acid or phthalic acid). Linear aliphatic epoxy resins may also be used of which epoxidized polybutadiene, epoxized soybean oil, or cycloaliphatic epoxy resins are examples. Further, radically curable resins having acrylate or vinyl groups can also be inventively utilized (i.e., N-vinyl pyrrolodone, trimethylolpropane triacrylate).

With respect to the solubility of the thermoplastic in the desired reaction resin, a chemical compatibility with the reaction resin must be established for this purpose. Although polar groups are not absolutely required, they do improve the solubility of the thermoplastic. The molecular weight or, respectively, the chain length of the thermoplastic polymer is an additional limiting factor for compatibility. Extremely high-molecular weight thermoplastics are therefore unsuitable.

The lower limit for the chain length of the thermoplastic polymer is determined according to the property of the pure thermoplastic. A low-molecular weight thermoplastic has poorer mechanical properties than a correspondingly higher molecular weight thermoplastic. Therefore, the lower weight thermoplastic produces fewer advantages in the reaction resin system, since the properties of the pure thermoplastic also determine the properties of the cured shaped material which is obtained from the reaction resin system.

High-performance thermoplastics, also referred to as engineering thermoplastics, exhibit good physical properties including high moduluses, tenacity, tear resistance, tensile strength and high flexibility. Excluded from this group of thermoplastics are the liquid-crystalline polymers whose use in the reaction resin system is possible but not as optimum. High-performance thermoplastics having an amorphous structure are preferred. Representatives of this group include polyethersulphone, polyetherimide, polyethyleneterephthalate, polysulphone, polyarylate, polycarbonate, polyamide-polyimide, polyimide, and polyamide.

In an embodiment, a further constituent of the reaction resin system is a photoinitiator or a photoinitiator system. A photoinitiator can be a discrete soluble compound in the reaction resin. Chemical structures that are a constituent of the thermoplastic are also suitable as photoinitiators. In this case, an additional photoinitiator is not required.

For a cationic curing mechanism, photoinitiators are derived from stable organic cations, particularly with sulphur or iodine as the central atom. Aromatic onium salts having complex anions have proven especially advantageous. Further, a photoinitiator containing a Lewis acid can be used as a pi donor transition metal complex. Phenacyl sulphonium salts, hydroxylphenyl-sulphonium salts as well as sulfoxonium salts can also be used. Further, organic silicon compounds that release a silanol upon ultraviolet radiation initiate a cationic curing in the presence of aluminum alcoholates.

Photoinitiators suitable for radical polymerization are aromatic ketones such as acetophenone and benzophenone derivatives, or other compounds that have H-abstraction or are alpha splitters.

Additives can also be contained in the reaction resin system or the cured shaped material of the present invention in addition to the above-disclosed constituents. The reaction resin system can, thus, be given additional properties without effecting the aforementioned properties. Additives can include colorants, pigments, flow modifiers, stabilizers, flame-retardants, or fillers. It is, therefore, almost always possible to introduce new properties with a suitable thermoplastic based on additives, for example, a selective absorption or transparency on the basis of a colorant.

In producing the radiation-curable reaction resin system, the constituents are mixed together under elevated temperatures. Low-solubility thermoplastics are preferably utilized as a fine powder in order to shorten the time for producing a homogeneous solution. It is also possible to produce the solution in a solvent and then subsequently remove it. However, this method is only suitable when low-volatility reaction resins constituents are used, and is of little value when correspondingly low-viscosity reaction resins are used.

The curing reaction of the reaction resin system is triggered by irradiation, preferably by ultraviolet irradiation. When a photoinitiator is selected that is only sensitive in the ultraviolet range, storage of the completely mixed reaction resin system is also possible under longer-wave light and for longer periods of time. Demixing of the constituents has not been observed. Further, even after longer storage, the reaction resin system can be immediately applied without further measures or can be processed in some other way and then cured.

By way of example and not limitation, the following examples of specific methods and compositions of reaction resin systems serve to further illustrate principles of the present invention and embodiments.

EXAMPLE 1—Composition of Radically Curable Formulations

The composition of radically curable formulations that were used are listed in Table 1. The utilized constituents are described in mass parts. The mixtures of reactive resin constituents and thermoplastics were homogenized at slightly elevated temperatures (60°–90° C.), and the photoinitiators were stirred in at room temperature upon exclusion of short-wave light. Degasification is subsequently carried out under reduced pressure ($\leq 1$ mbar).

TABLE 1

Composition of Exemplary, Radically Curable Formulations

| Example | 91/01 | 91/02 | 92/02 | 92/12 | RTX038 |
|---|---|---|---|---|---|
| N-vinylpyrrolidone (Merck Schuchardt) | 82 | 82 | 68 | 76 | 80 |
| Trimethylolpropane triacrylate (UCB) | — | — | 17 | 20 | — |
| Polyamide (Eurelon 2140, Schering) | — | — | — | 4 | — |
| Polyethersulphone (Victrex PES 3600, ICI) | 18 | — | — | — | — |
| Polyethersulphone (Victrex PES 5200, ICI) | — | 18 | 15 | — | — |
| Polyetherimide (Ulten 1000, GEC) | — | — | — | — | 20 |
| Acetophenone derivative (Irgacure 907, Ciba Geigy) | 3.5 | 3.5 | 2.5 | 2 | — |
| Acetophenone derivative (CGI 369, Ciba Geigy) | — | — | — | — | 1.0 |

The resin specimens were cured in Teflon forms having rectangular depressions in a thickness of 1 mm on the basis of ultraviolet irradiation with a mercury medium-pressure lamp. The irradiation intensity was approximately 100 mW/cm$^2$, and the irradiation duration was about one minute.

EXAMPLE 2—Properties of Resins and Shaped Members

Table 2 illustrates some of the relevant properties of the resin mixtures and the cured resins. Viscosity was measured with a plate/cone viscosimeter at 25° C., and was recited in Pas. The maximums of the loss factors were recited by the dynamic-mechanical analysis (DMTA, Polymer Labs).

TABLE 2

Properties of Resins and Shaped Members

| | Appearance of the Mixture | Viscosity of the Mixture | Appearance of the Shaped Material | Tan Delta Maximums (DMTA) |
|---|---|---|---|---|
| 91/01 | nearly colorless, clear | 0.25 | light yellow, clear | 128/160 |
| 91/02 | nearly colorless, clear | 0.9 | light yellow, slightly cloudy | 155/175 |
| 92/02 | nearly colorless, clear | 1.0 | whitish, slightly cloudy | 150/174 |
| 92/12 | nearly colorless, slightly cloudy | 3.9 | caseously cloudy, yellowish | — |
| RTOX308 | nearly colorless, clear | 3.0 | light yellow, clear | 130/210 |

As previously mentioned, the manufactured and cured resins have two maximums in the Tan Delta spectrum. By comparison, pure ultraviolet-cured N-vinylpyrrolidine exhibited only one Tan Delta peak.

EXAMPLE 3—Composition of Cationically Curable Formulations

As illustrated in Table 3, the utilized constituents are described in mass parts. The mixtures of reactive resin constituents and thermoplastics were homogenized at slightly elevated temperatures (60°–90° C.); the photoinitiators are stirred in at room temperature upon exclusion of short-wave light. Again, degasification was subsequently carried out at diminished pressure (<1 mbar).

TABLE 3

Composition of Exemplary, Cationically Curable Formulations

| Example | RTX030 | RTX032 | RTX045 | 93/01 | 93/02 |
|---|---|---|---|---|---|
| Cycloaliphatic di-epoxy (CY 179, Ciba Geigy) | — | — | 90 | 61 | 61 |
| Triethyleneglycol di-vinylether (GAF Europe) | — | — | — | 23 | 23 |
| Aromatic di-epoxy (MY 790, Ciba Geigy) | 50 | — | — | — | — |
| Aromatic di-epoxy (PY 306, Ciba Geigy) | — | 50 | — | — | — |
| Cresylglycidyl-ether (DY 023, Ciba Geigy) | 50 | 50 | — | — | — |
| Polyether-sulphone Victrex PES 3066, ICI) | 17.6 | 17.6 | — | 16 | — |
| Polyether-sulphone (Victrex PES 5200, ICI) | — | — | — | — | 16 |
| Polyarylcarboxylate (Durel 400, Celanese) | — | — | 10 | — | — |
| Solution of arylsulphonium-hexafluoro-antimony salt (UVI 6974, Union Carbide) | 1.2 | 1.2 | 1 | 1 | 1 |

The resin specimens were cured in Teflon forms having rectangular depressions in a thickness of 1 mm by ultraviolet irradiation with a mercury medium-pressure lamp The irradiation intensity was approximately 100 mW/cm$^2$, and the duration of the irradiation was about 1–3 minutes.

EXAMPLE 4—Properties of Resins and Shaped Members

Table 4 provides information about properties of the resin mixtures and of the cured resins. The viscosities were measured with a plate/cone viscosimeter at 25° C., and were recited in Pas. The maximums of the loss factors were recited from the dynamic mechanical analysis (DMTA, Polymer Labs).

TABLE 4

Properties of Resins and Shaped Members

| | Appearance of the Mixture | Viscosity of the Mixture | Appearance of the Cured Shaped Material | Tan Delta Maximums (DMTA) |
|---|---|---|---|---|
| RTX030 | nearly colorless, clear | 9.0 | opaque, whitish brown | 70/210 |
| RTX032 | nearly colorless, clear | 15 | opaque, whitish brown | 68/215 |
| RTX045 | nearly colorless, slightly cloudy | 10.2 | opaque, white | 162/215 |
| 93/01 | nearly colorless, clear | 9.6 | opaque, whitish brown | 101/153 |
| 93/02 | nearly colorless, slightly cloudy | 27 | opaque, yellowish brown | 74/148 |

For a comparison, a mixture was cured that corresponded to Examples 93, but contained no thermoplastic. A Tan Delta peak appeared at only 135° C.

According to DIN 53455, the tensile test yielded an elongation at tear of 27% with Example RDX 030, as compared to 9.5% with the thermoplastic-free Example RTX 030 (–). The results indicate the noticeable improvements that can be achieved with the reaction resin systems of the present invention, and the superior mechanical properties the corresponding shaped members have obtained in comparison to pure reaction resins.

It should be understood that various changes and modifications to the presently preferred embodiments described herein will be apparent to those in the art. Such changes and modifications can be made without departing from the spirit and scope of the present invention and without diminishing its attendant advantages. It is, therefore, intended that such changes and modifications be covered by the appended claims.

We claim:

1. A UV-curable resin composition consisting essentially of: a substantially homogeneous, storage stable resin solution of at least one radical polymerizable curable reaction resin selected from the group consisting of N-vinyl pyrrolidone, trimethylolpropane triacrylate and mixtures of the foregoing resins; from about 3 to about 50% by weight of an engineering thermoplastic resin having a high modulus selected from the group consisting of polyethersulfones, polyetherimides, polyesters, polysulfones, polyacrylates, polycarbonates, polyamideimides, polyimides and polyamides: a photoinitiator capable of generating radicals upon exposure to UV radiation selected from aromatic ketone photoinitiators; and optionally including an additive selected from the group consisting of colorants, pigments, flow modifiers, stabilizers, flame retardants and fillers, said resin composition being curable upon exposure to UV radiation to provide a substantially homogenous cured shaped article including continuous phase and discontinuous phase, the discontinuous phase having an average particle size of between from about 0.05 μm to about 50 μm.

2. A UV-curable resin composition as defined in claim 1, wherein the photoinitiator is acetophenone.

3. A shaped article for use in high operating temperature conditions, said shaped article consisting essentially of a UV-cured substantially homogenous resin composition including a continuous phase of at least one cured radical-polymerizable curable reaction resin selected from the group consisting of N-vinyl pyrrolidone, trimethylolpropane triacrylate and mixtures of

4. A UV-curable resin composition consisting essentially of: a substantially homogenous storage stable resin solution of:

a curable epoxy resin;

from about 3 to about 50% by weight of an engineering thermoplastic resin having a high modulus; and a photoinitiator capable of curing the epoxy resin upon exposure to UV radiation, said composition being curable on exposure to UV radiation to provide a substantially homogenous cured shaped article including a continuous phase and a discontinuous phase, the discontinuous phase having an average particle size of between about 0.05 µm to about 50 µm.

5. A method for making a shaped article from a reaction resin exhibiting improved mechanical properties including a discontinuous thermoplastic phase of controlled dispersivity, said method comprising the steps of:

providing a substantially homogenous resin solution including a curable reaction resin, from about 3 to about 50% by weight of an engineering thermoplastic resin having a high modulus, and a photoinitiator capable of curing the reaction resin upon exposure to UV radiation;

molding the resin solution to provide a desired shape; and thereafter curing the molded resin solution by exposing the molded resin solution to UV radiation under controlled conditions of temperature and radiation power to provide a substantially homogenous shaped article including a continuous phase and a discontinuous phase having controlled dispersivity such that the discontinuous phase has an average particle size of from about 0.05 µm to about 50 µm.

6. A method as defined in claim 5, wherein the dispersivity of the discontinuous phase in controlled by selecting temperature and radiation power conditions on curing so that at lower curing temperatures or lower power radiation conditions a discontinuous phase having relatively large particle sizes is obtained and at higher curing temperature or higher power radiation conditions a discontinuous phase having relatively smaller particle sizes is obtained. the foregoing resins and a discontinuous phase including an engineering thermoplastic resin having a high modulus selected from the group consisting of polyethersulfones, polyetherimides, polyesters, polysulfones, polyacrylates, polycarbonates, polyamideimides, polyimides and polyamides, a photoinitiator capable of generating radicals upon exposure to UV radiation selected from aromatic ketone photoinitiators, the discontinuous phase having an average particle size of between about 0.05 µm to about 50 µm.

\* \* \* \* \*